United States Patent [19]

Abbas

[11] Patent Number: 4,511,248

[45] Date of Patent: Apr. 16, 1985

[54] ACTIVE ELECTRO-OPTICAL DISTANCE DETECTION METHODS AND DEVICES

[75] Inventor: Daniel C. Abbas, Webster, N.Y.

[73] Assignee: Eastman Kodak Company, Rochester, N.Y.

[21] Appl. No.: 394,002

[22] Filed: Jun. 30, 1982

[51] Int. Cl.[3] .......................... G01C 3/08; G01C 3/10
[52] U.S. Cl. ............................................. 356/4; 356/1
[58] Field of Search ...................... 354/403; 356/1, 4; 102/213

[56] References Cited

U.S. PATENT DOCUMENTS

| | | | |
|---|---|---|---|
| 3,455,243 | 7/1969 | Martin | 102/213 |
| 3,617,128 | 11/1971 | Harvey | 356/4 |
| 3,679,307 | 7/1972 | Zoot et al. | 356/1 |
| 3,792,928 | 2/1974 | Poilleux | 356/4 |

Primary Examiner—S. C. Buczinski
Attorney, Agent, or Firm—Raymond L. Owens

[57] ABSTRACT

Active distance detection is effected by (1) directing light through a lens to an object, from an emitter zone located at or proximate the lens focal plane, (2) sensing the amplitude of light reflected back through the lens from the object at two or more detection zones that are located respectively at different distances from the emitter zone and that are generally coplanar with the emitter zone in a plane substantially normal to the optical axis of the lens, and (3) comparing the amplitudes of object-reflected light at the detection zones in a manner determinative of the unique distance-from-emitter-zone versus reflected-light-amplitude curve of the object's distance.

6 Claims, 9 Drawing Figures

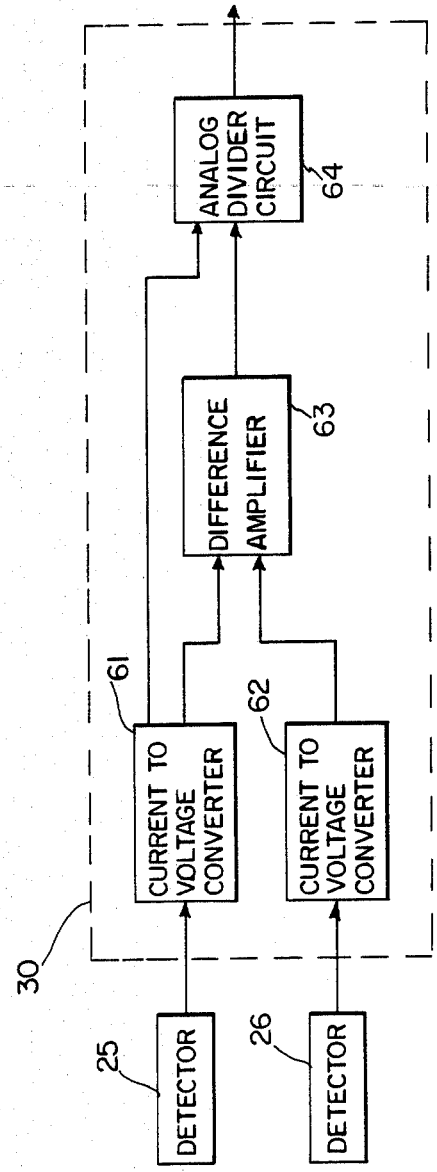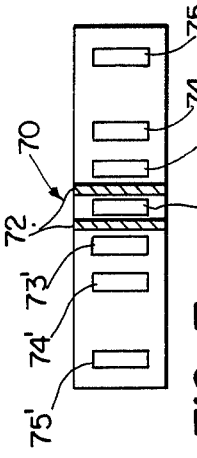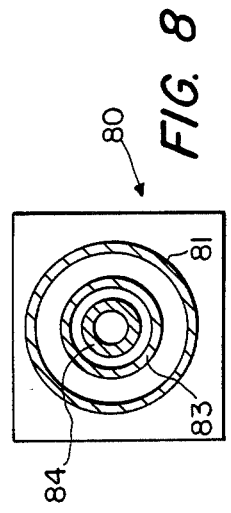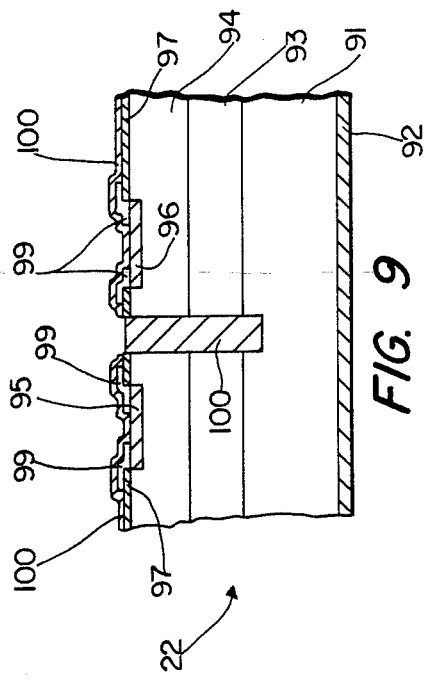

ACTIVE ELECTRO-OPTICAL DISTANCE DETECTION METHODS AND DEVICES

BACKGROUND OF THE INVENTION

1. Field of the Invention

The present invention relates to methods and devices for electro-optically detecting the distance to an object and more particularly to active detecting devices and methods wherein a radiation beam is transmitted to the object and reflected back to photoelectric sensor means.

2. Description of Prior Art

Distance detecting devices are employed in a variety of prior art apparatus. For example such devices are useful in focus control systems, e.g. as rangefinders in cameras, to determine the proper focus position for a lens. There are many other uses for distance detection devices, and there are many different prior art structures and techniques for effecting such detection.

Active electro-optical distance detection devices, which form one useful class within a wide variety of distance detecting approaches, typically employ a light emitter(s), optical means (e.g. a lens) for directing emitted light toward the object to be sensed, a photoelectric detector(s) for sensing light reflected from the object and optical means for directing the reflected light onto the detector(s). U.S. Pat. Nos. 3,443,502; 3,720,148 and 4,065,778 are exemplary of triangulation techniques for active distance detection; the emitter means and detector means are spaced a known distance along a triangle base and the devices compute the object distance based on a measure of the angle between the emitted beam axis and the axis of the beam reflected from the object. These devices require separate projecting and receiving optics and precise relative positioning of the emitter and detector means.

The device disclosed in U.S. Pat. No. 3,617,128 differs from triangulation-type distance detectors in that light is directed to the object and reflected back to the detectors along a generally common axis. The object distance is determined as being within one of a plurality of discrete range-zones based on the size of the object's reflected light "blur circle" (i.e., the out of focus light spot formed at a detection plane, substantially normal to the optical axis of the device's receiving lens, by the object-reflected light). Blur circle size is determined only approximately as extending onto (or not extending onto) different ones of a plurality of detectors located at different positions in the detection plane. This device also uses separate projecting and receiving optics and requires accurate alignment of the lenses, the emitter and detectors.

SUMMARY OF THE INVENTION

The present invention provides active electro-optical distance detecting devices and methods that offer accurate detection, simplified physical construction and relaxation of alignment procedures.

In one aspect, it is an advantage of the present invention that a common lens means can be utilized to both project and receive the distance-detection light. A related advantage of the present invention is good optical efficiency in the collection of reflected light.

In another important aspect, an advantage of the present invention is to provide detection of object distance within one substantially continuous range-region, as an analog output, rather than detecting the one of a plurality of discrete range-zones within which the object resides. Another important advantage of the present invention is its relatively low sensitivity to variations in reflectivity among different objects to be distance-detected.

The above and other advantages and objects of the present invention are attained in accordance with one embodiment of the present invention by (1) directing light through a lens to an object, from an emitter zone located at or proximate the lens focal plane, (2) sensing the amplitude of light reflected back through the lens from the object at two or more detection zones that are located respectively at different distances from the emitter zone and that are generally coplanar with the emitter zone in a plane substantially normal to the optical axis of the lens, and (3) comparing the amplitudes of object-reflected light at the detection zones in a manner determinative of the unique distance-from-emitter-zone versus reflected-light-amplitude curve of the object's distance.

In one preferred structural embodiment of the present invention the sensing of reflected light amplitude is effected by first and second photoelectric transducers located in a common emitter-detector plane with, and at different distances from, a light emitter. A single lens is mounted with its optical axis normal to the common emitter-detector plane and its focal plane at or proximate such common plane. Signal processing means are responsive to electrical signals from the first and second transducers to provide an output signal indicative of object distance. In a particularly preferred embodiment the detector and emitter means comprise a solidstate, integrated circuit.

BRIEF DESCRIPTION OF THE DRAWINGS

The subsequent description of preferred embodiments of the invention refers to the attached drawings wherein:

FIG. 6 is a diagram illustrating one preferred embodiment of signal processing circuitry in accord with the present invention;

FIGS. 7 and 8 are views similar to FIG. 3 but showing alternative preferred embodiments of the present invention; and FIG. 9 is a cross-sectional view of one preferred integrated circuit embodiment of emitter-detector panel useful in accord with the present invention.

DETAILED DESCRIPTION OF PREFERRED EMBODIMENTS

Figure 1:
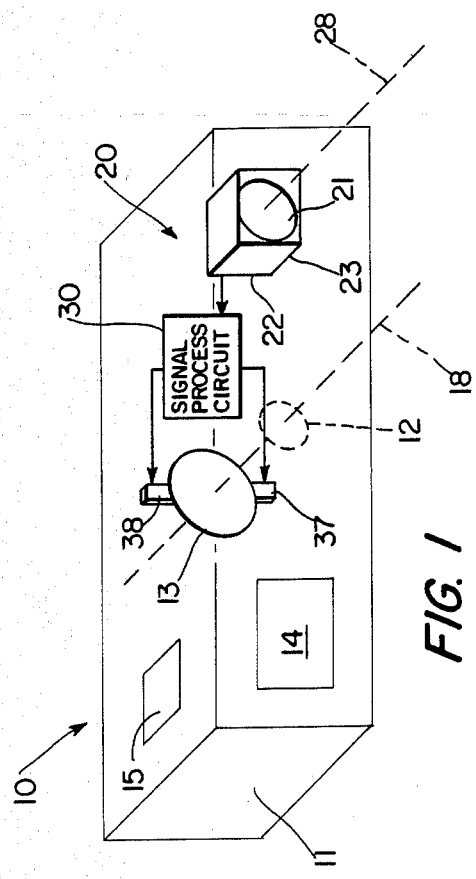
FIG. 1 is a schematic perspective view of a camera employing a distance detection device of the present invention as a rangefinder.

FIG. 1 illustrates the present invention schematically as employed in one preferred application, i.e., in a still camera 10 of the kind known in the art and including a housing 11, aperture 12, taking lens 13, viewfinder 14, shutter release 15 and other conventional still camera mechanisms (not shown). In the illustrated still camera the distance detector of the present invention, denoted generally 20, is embodied as a rangefinder for controlling the position of the camera's taking lens 13.

Figure 3:
FIG. 3 is a front view of the emitter-detector portion of the distance detection device shown in FIG. 2.
Figure 2:
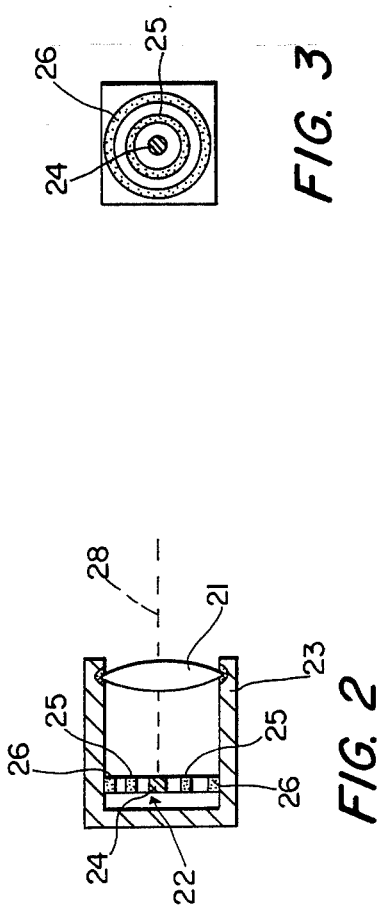
FIG. 2 is a sectional side view of one embodiment of distance detection device in accord with the present invention.

The distance detector 20 comprises, in general, lens means 21 mounted in predetermined spaced relation with respect to an emitter-detector panel 22 by support means 23. The details of the distance detector 20 can be seen more clearly in FIGS. 2 and 3, and it will be noted that the emitter-detector panel 22 comprises a light emitter 24 and two concentric photodetectors 25 and 26 respectively located at different distances from emitter 24. The emitter 24 and detectors 25 and 26 lie substantially in a common emitter-detector plane and are mounted in general alignment with the optical axis 28 of lens means 21, with the common emitter-detector plane substantially normal to axis 28. In one preferred embodiment the emitter 24 can be a light emitting diode (LED) adapted to emit visible or other radiation. The term "light" as used herein includes visible as well as other radiation beyond the normal visible range of the electromagnetic spectrum. The detectors 25 and 26 can be any of a variety of photoelectric transducers such as photocells or semiconductor light sensors. Lens means 21 can comprise a single convex lens element, as illustrated, or more complex multi-element structures. The lens desirably is optimized for operation at the emitter wavelength (e.g. in regard to antireflection coatings) and need not be corrected for chromatic aberration.

Figure 4:
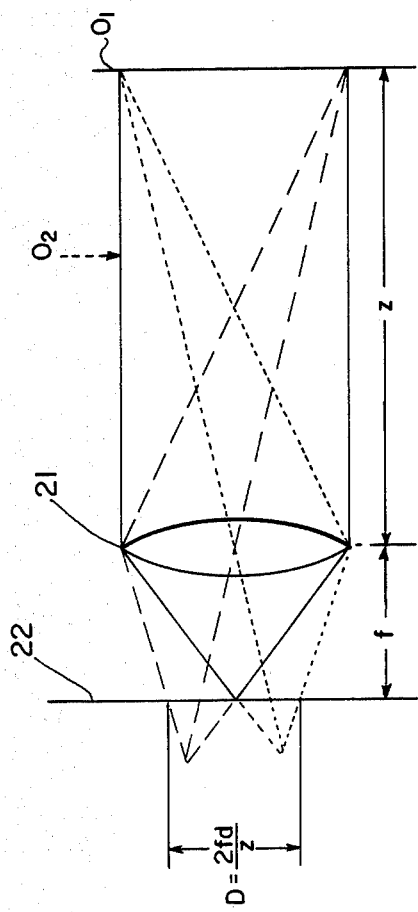
FIG. 4 is a diagram illustrating by rays the light emitted to and reflected from an object in accord with the present invention.

The distance between the lens means 21 and the common emitter-detector plane of panel 22 is important in accordance with the present invention. This can be explained more easily with reference to FIG. 4, where the plane of a reflective object $O_1$, the lens means 21 and the emitter-detector plane 22 are illustrated in one exemplary interrelation. As shown, the emitter-detector plane 22 is preferably located at or proximate the focal plane of lens 21. With this arrangement the light emitted from emitter 24 is directed (solid lines) substantially parallel to the optical axis 28, which extends along the detection region of the device 20, to the object $O_1$. The light reflected from the object $O_1$ (dotted and dash lines) passes back through lens 21 to plane 22 in a manner uniquely dependent on the distance of the object from the detection device. Specifically the extent of the out-of-focus condition of the reflected light spot at plane 22 is inversely proportional to the distance of the object from lens 21. When the plane 22 is precisely at the focal plane of lens 21, the diameter D of the "blur circle" at plane 22 is defined by the relation:

$$D = \frac{2fd}{Z}$$

where f is the focal length of the lens, d is the lens diameter and Z is the object distance. For other plane 22 positions proximate the focal point of lens 21, the size of the blur circle also is a monotonically decreasing function of the distance of the light-reflecting object.

Because of the above-described blur-circle-size to object distance relation, the relative light intensity within the blur circle at different distances from the light emitter 24 varies in a way uniquely indicative of the object distance (generally linearly with respect to distance from the emitter). The approach of the present invention uses this characteristic (i.e. that the slope of the unique relative light intensity to distance from emitter curves vary predictably with object distance) to derive outputs respectively representative of the distance to different objects.

Figure 5:
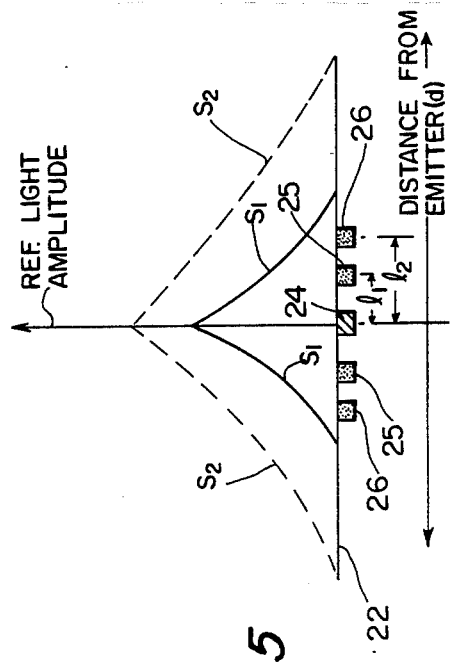
FIG. 5 is a reflected-light-amplitude versus distance-from-detector curve, useful in accord with the present invention, for two different-distance objects.

FIG. 5 illustrates graphically the principles underlying one preferred distance detection approach in accord with the present invention by means of a plot of the amplitude of reflected light at plane 22 versus the distance from the emitter 24. In FIG. 5 it can be noted that the curve $S_1$ representing the amplitude versus distance-from-emitter characteristic of light reflected from object $O_1$ is significantly different from the similarly-plotted curve $S_2$, which corresponds to light reflected from closer object $O_2$. In a preferred mode of the present invention, the distance to a particular object is determined by identifying its unique relative-light-amplitude versus distance-from-emitter characteristic at plane 22.

One advantageous way to identify the different object-reflected light characteristics representing different object distances (e.g. curves $S_1$ and $S_2$) is by means of a slope value for the curve. For this purpose, at least two detectors 25, 26 are located at different distances $l_1$ and $l_2$ from the emitter 24 and provide electrical signals of amplitude proportional to the light amplitudes respectively incident thereon. A normalized slope value "s" for the curve therefore can be determined by simple analog signal processing circuitry by the relation $$s = \frac{A_1 - A_2}{l_1 - l_2} \cdot \frac{1}{A_1}$$

where $A_1$ and $A_2$ are the amplitudes of the electrical signals from detector 25 and 26 respectively. In the above relation, the slope value is normalized by the factor $1/A_1$ because the amount of light reflected back from a given object (and collected by lens 21) varies inversely with object distance. Normalization also is important because different objects have different reflectivities. It will be appreciated that a sensed value other than $A_1$ can be used for normalization, it being preferred to obtain a reflected light amplitude value from a location on plane 22 that is as close to the emitter as practical.

Modes of distance detection in accord with the present invention, and the preferred mode as described above, will be further clarified by referring to the exemplary signal processing circuit 30 shown in FIG. 6. As shown, the current output currents from photodetectors 25 and 26 are applied to respective current to voltage converter circuits 61, 62 (e.g. operational amplifiers), whose outputs are applied to a difference amplifier circuit 63. In the illustrated embodiment difference amplifier 63 performs the operation $A_1-A_2$ of the above equation and applies the resultant analog difference signal to analog divider circuit which can be one of various types known in the art (e.g. having matched MOS transistors or operational amplifiers). The circuit 64 performs the normalization dividing $A_1-A_2$ by the quantity $A_1$ provided by converter 61. The resultant analog signal is uniquely indicative of a particular object distance.

In one preferred embodiment shown in FIG. 1, such signal processing circuit 30 provides its outputs (control voltages of varying magnitude dependent on object distance) to control the flexure of bimorph bender elements 37, 38, and thus the position of taking lens 13 along the picture taking optical axis 18 of the camera. In the rangefinder application shown in FIG. 1 it is preferred that the optical axis 28 of the device 20 be substantially parallel to the taking lens axis 18. Further detailed description of suitable bimorph bender constructions and electrical control for lens positioning is set forth in U.S. application Ser. No. 205,074, entitled "Device for Improved Focus and Alignment Control In Optical Recording and/or Playback Apparatus" and filed Nov. 10, 1980 in the name of D. J. Howe, which is incorporated herein by reference. For larger lens focus displacements the output of processing circuit can control a lens drive motor (e.g. by means of a read only memory or potentiometer circuit) to move the lens 13 to the proper position for a detected object.

As noted above, the emitter-detector plane preferably is located at or proximate the focal plane of the lens 21. The desired precision of such placement depends upon the focal length of the lens and upon the accuracy of distance detection needed for a particular application. For example with a lens having focal length f=50 mm, a spacing of the emitter plane 0.08 mm behind the lens focal plane causes less than 10% difference in the output signal at a target distance of 3 m or less (compared to the signal from positioning precisely at the lens focal plane). In some applications it is preferred to position the emitter slightly behind the lens focal plane to focus the emitted light toward a point beyond the object ranges of interest.

The emitter-detector configuration preferably is generally centered with respect to the optical axis of the lens 21. However, this alignment is quite forgiving. For example with the lens described above a centering deviation of 7 mm from the optical axis produces only about 1% signal change (compared to the signal from a configuration precisely centered on the lens optical axis).

FIGS. 7 and 8 illustrate alternative preferred configurations for emitter-detector panels. In FIG. 7 the panel 70 comprises an emitter bar 71 which is optically isolated by elements 72 (e.g. a carbon-filled plastic chip) from detector bars 73,73′, 74,74′ and 75,75′. In this embodiment additional detectors 75,75′ are spaced further from the emitter 71 to provide added accuracy for close-in distances (where the slopes of the curves S are more gradual). In the FIG. 8 embodiment, the emitter-detector configuration provides the emitter 81 at an outer concentric location to inner concentric detectors 83 and 84.

FIG. 9 illustrates a particularly preferred construction for emitter-detector panel 22. In this configuration the emitter and detectors are formed as a monolithic, integrated array of solid state devices. The panel 22 shown in FIG. 9 comprises a gallium arsenide substrate 91 (n-Ga As) material overlying a metal layer 92 e.g. a gold-germanium alloy) and having formed thereon as gallium arsenide phosphide layers 93 (graded epitaxial layer of n-Ga $As_{1-y}Py$) and 94 (epitaxial layer n-Ga $As_{1-x}Px$). The emitter and detector p regions 95 and 96 respectively are formed by standard photolithographic techniques and zinc diffusions to comprise p-Ga $As_{1-x}Px$ material. A silicon nitride dielectric layer 97 isolates the emitter and detector regions electrically and an optically dense material, e.g. carbon-filled plastic is formed in a cut groove 98 to optically separate the regions 95 and 96. Electrodes 99 are formed of aluminum and configured by standard metallization techniques, and an antireflection coating 100 is formed on the emitter and detector regions as shown.

One skilled in the art will appreciate that the present invention can be highly useful in modified embodiments and in different applications than shown in the attached Figures and that various highly useful advantages pertain to the present invention.

For example, the present invention is simple optically (because it can use a single lens element) and electrically (because analog signal can be used). It will be appreciated, however, that digital processing circuitry (e.g a microprocessor circuit on a read only memory circuit) can be used if desired. Structures in accord with the present invention facilitate alignment because the emitter and detectors can be fabricated together and because the single lens causes the reflected image to always be centered on the emitter.

Further the number of range zones detectable in accord with the present invention is not a function of the number of detectors utilized. That is, the distance sensitivity of the present invention is substantially signal-to-noise limited not number-of-detector limited. Additionally, the present invention is not highly sensitive to variance in object reflectivity because the sensor outputs are compared to each other rather than to predetermined thresholds. In certain applications it may be desirable to employ the present invention in conjunction with signal processing circuitry which subtracts background noise such as that due to ambient light.

The invention has been described in detail with particular reference to preferred embodiments thereof, but it will be understood that variations and modifications can be effected within the spirit and scope of the invention.

What is claimed is:

1. A device for determining the distance to a light reflective object, said device comprising:
    (a) lens means having an optical axis and a focal plane;
    (b) emitter means for directing light through said lens means to such object from an emitter zone at or proximate said focal plane;
    (c) detector means for producing signals indicative of the amplitude of light, within the blur circle formed by the light reflected from said object back through said lens means, at two detection zones respectively located at different distances from said emitter zone, said detection zones being coplanar with said emitter zone in a plane substantially normal to the optical axis of said lens means; and
    (d) signal processing means responsive to the detector means signals to produce an output signal indicative of the difference in amplitudes of such detector means signals, such that said output signal is substantially proportional to the slope of the distance-from-emitter zone versus light-amplitude curve of object reflected light, such slope varying predictably with object distance; whereby said output signal is indicative of an object's distance from the device.

2. The invention defined in claim 1 wherein said signal processing means includes means for normalizing said output signal such that said normalized output signal is substantially the same for objects of different reflectivity which are located the same distance from the device.

3. An active, electro-optic device for detecting the distance to a radiation-reflective object within a device detection region, said device comprising:
    (a) lens means having a focal plane and an optical axis extending along said detection region;

(b) emitter means for emitting light through said lens means into said detection region;

(c) detector means, including first and second photoelectric transducer, which are:
  (1) respectively located at first and second distances from said emitter within the blur circle formed by emitted and object reflected light on a common emitter-detector plane, and
  (2) respectively adapted to produce first and second electrical signals indicative of the amplitude of the emitted and object-reflected light which is incident thereon;

(d) means for mounting said emitter means and said detector means in general alignment with said optical axis and with said common plane substantially normal to said optical axis and at or proximate said focal plane;

(e) signal processing means responsive to said first and second electrical signals for producing an output signal which is a function of the difference in the amplitudes of such signals and is substantially proportional to the slope of the light-amplitude versus distance-from-emitter curve of object reflected light wherein said slope varies predictably with said object distance; and (f) said signal procdssing means including means for normalizing said output signal such that said output signal is substantially the same for objects of different reflectively which are located the same distance from the device.

4. The invention defined in claim 1 or 3 wherein said detector means and said emitter means are formed on a common planar substrate.

5. The invention defined in claim 4 wherein said detector means and said emitter means are constructed as a solid-state, integrated circuit.

6. A method for determining the distance to a light reflective object, said method comprising:
  (a) directing light to such object through a lens, from an emitter zone located at or proximate the lens focal plane;
  (b) sensing the amplitude of the light within the blur circle formed by the light that is reflected back through said lens from such object at two detection zones which are located respectively at different distances from said emitter zone and which are both substantially coplanar with said emitter zone in a plane substantially normal to the optical axis of said lens;
  (c) comparing the amplitudes of object-reflected light at said two detection zones in a manner which identifies the difference in amplitudes of said object-reflected light, said difference in amplitudes being substantially proportional to the slope of the distance-from-emitter zone versus light amplitude curve of object-reflected light such slope varying predictably with object distance; and
  (d) dividing said difference in amplitudes by the amplitude of object-reflected light at one of said two detection zones in a manner which identifies such object's distance.

* * * * *